United States Patent
Zhu et al.

(10) Patent No.: US 11,660,538 B2
(45) Date of Patent: May 30, 2023

(54) METHODS AND SYSTEMS FOR GAME SYSTEM CREATION

(71) Applicant: Unity IPR ApS, Copenhagen (DK)

(72) Inventors: Ming Zhu, El Sobrante, CA (US); Benan Arigil, San Mateo, CA (US)

(73) Assignee: Unity IPR ApS, Copenhagen (DK)

( * ) Notice: Subject to any disclaimer, the term of this patent is extended or adjusted under 35 U.S.C. 154(b) by 12 days.

(21) Appl. No.: 17/027,674

(22) Filed: Sep. 21, 2020

(65) Prior Publication Data

US 2021/0086080 A1 Mar. 25, 2021

Related U.S. Application Data

(60) Provisional application No. 62/903,503, filed on Sep. 20, 2019.

(51) Int. Cl.
  *G06F 9/24* (2006.01)
  *A63F 13/00* (2014.01)
  *A63F 13/70* (2014.01)
  *A63F 13/60* (2014.01)

(52) U.S. Cl.
  CPC .............. *A63F 13/60* (2014.09); *A63F 13/70* (2014.09); *A63F 2300/209* (2013.01); *A63F 2300/55* (2013.01); *A63F 2300/6009* (2013.01)

(58) Field of Classification Search
  CPC .......... A63F 13/60; A63F 13/63; A63F 13/69; A63F 2300/209; A63F 2300/5526; A63F 2300/5533; G06F 16/25; G06F 8/315; G06F 8/34; G06F 8/36
  See application file for complete search history.

(56) References Cited

U.S. PATENT DOCUMENTS 6,009,458 A * 12/1999 Hawkins ................. A63F 13/60
                                                          709/212

* cited by examiner

*Primary Examiner* — Lawrence S Galka
(74) *Attorney, Agent, or Firm* — Schwegman Lundberg & Woessner, P.A.

(57) ABSTRACT

A method for automatically connecting game items for sharing by a plurality of game systems is disclosed. A first game system is added to a computer-implemented game. The first game system is associated with a first game system definition. The first game system definition corresponding to a first game object. The first game system is automatically connected to a second game system. The automatic connecting includes, at least: identifying a correspondence between the first game system definition and a second game system definition, the second game system definition being associated with the second game system, the second game system definition corresponding to a second game object; and preventing a change to the first game object during runtime of the computer-implemented game based on a detection that the change to the first game object would violate a rule associated with the second game system definition.

13 Claims, 6 Drawing Sheets

METHODS AND SYSTEMS FOR GAME SYSTEM CREATION

CROSS-REFERENCE TO RELATED APPLICATIONS

This application claims the benefit of U.S. Provisional Application No. 62/903,503, filed Sep. 20, 2019, entitled "METHOD AND SYSTEM FOR MODULAR GAME SYSTEM CREATION," which is incorporated by reference herein in its entirety.

TECHNICAL FIELD

The subject matter disclosed herein generally relates to the technical field of computer systems, and in one specific example, to computer systems and methods for creating a video game.

BACKGROUND OF THE INVENTION

Current game development tools allow a game developer to create various aspects of a video game. Gameplay mechanics is an aspect of video game development that is creative and expressed in many different ways depending on a game type or genre. However, current game development tools operate at a "low level" wherein functionalities such as rendering, physics, and animation are common across game types and genres. The result is that a game built at a low level is tied to a specific genre (e.g., a match-3 framework, an idle-game framework, or a First-Person-Shooter game framework). Once a game has been created in one genre, it cannot easily be transitioned into another genre. Based on existing technology, it is easier and faster to create a game from scratch rather than to transition an existing game from one genre to another. Game development usually requires several basic gameplay systems that are common to most games. Developers have to spend time building and rebuilding these basic systems instead of being able to focus on what's unique and fun about their idea.

BRIEF DESCRIPTION OF THE DRAWINGS

Further features and advantages of example embodiments of the present invention will become apparent from the following detailed description, taken in combination with the appended drawings, in which.

DETAILED DESCRIPTION

Figure 1:
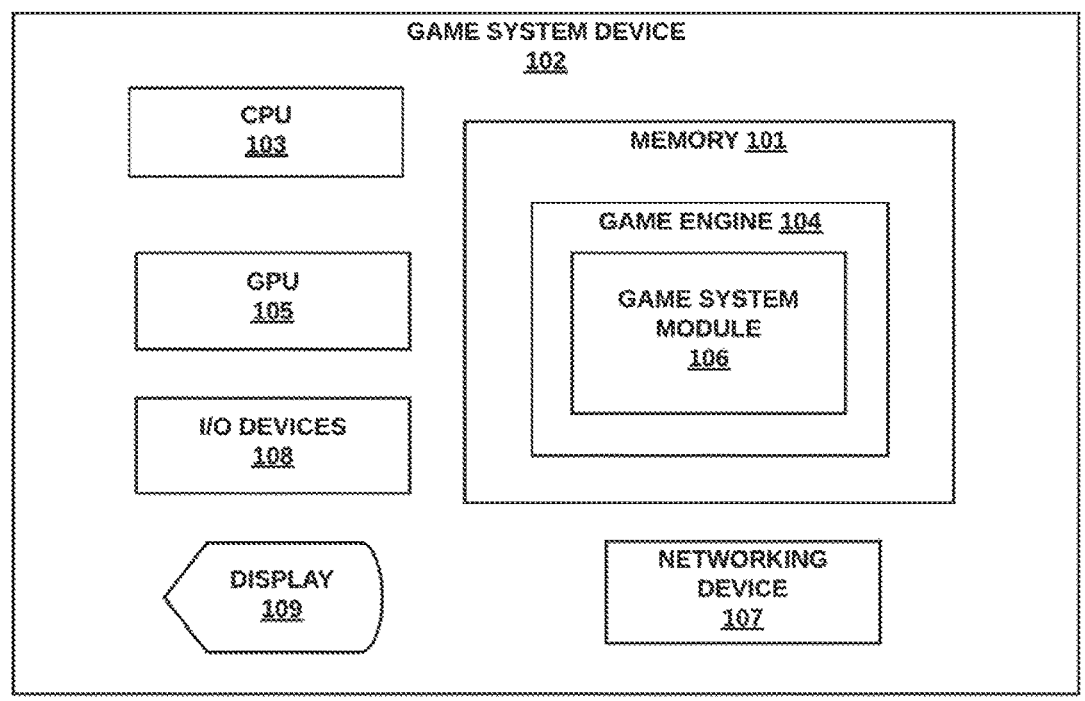
FIG. 1 is a schematic illustrating a game system device, in accordance with one embodiment.

The description that follows describes example systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the inventive subject matter. It will be evident, however, to those skilled in the art, that various embodiments of the inventive subject matter may be practiced without these specific details.

The term 'game' used throughout the description herein should be understood to include video games and applications that execute and present video games on a device, and applications that execute and present simulations on a device. The term 'game' should also be understood to include programming code (either source code or executable binary code) which is used to create and execute the game on a device.

The term 'environment' used throughout the description herein is understood to include 2D digital environments (e.g., 2D video game environments, 2D simulation environments, and the like), 3D digital environments (e.g., 3D game environments, 3D simulation environments, 3D content creation environment, virtual reality environments, and the like), and augmented realty environments that include both a digital (e.g., virtual) component and a real-world component.

The term 'game object', used throughout the description herein understood to include any digital object or digital element within an environment. A game object can represent (e.g., in a corresponding data structure) almost anything within the environment; including 3D models (e.g., characters, weapons, scene elements (e.g., buildings, trees, cars, treasures, and the like)) with 3D model textures, backgrounds (e.g., terrain, sky, and the like), lights, cameras, effects (e.g., sound and visual), animation, and more. The term 'game object' may also be understood to include linked groups of individual game objects. A game object is associated with data that defines properties and behavior for the object.

The terms 'asset', 'game asset', and 'digital asset', used throughout the description herein are understood to include any data that can be used to describe a game object or can be used to describe an aspect of a digital project (e.g., including: a game, a film, a software application). For example, an asset can include data for an image, a 3D model (textures, rigging, and the like), a group of 3D models (e.g., an entire scene), an audio sound, a video, animation, a 3D mesh and the like. The data describing an asset may be stored within a file, or may be contained within a collection of files, or may be compressed and stored in one file (e.g., a compressed file), or may be stored within a memory. The data describing an asset can be used to instantiate one or more game objects within a game at runtime.

The term 'runtime' used throughout the description herein should be understood to include a time during which a program (e.g., an application, a video game, a simulation, and the like) is running, or executing (e.g., executing programming code). The term should be understood to include a time during which a video game is being played by a human user or played by an artificial intelligence agent.

The terms 'client' and 'application client' used throughout the description herein are understood to include a software client or software application that accesses data and services on a server, including accessing over a network.

A method for automatically connecting game items for sharing by a plurality of game systems is disclosed. A first game system is added to a computer-implemented game. The first game system is associated with a first game system definition. The first game system definition corresponding to a first game object. The first game system is automatically connected to a second game system. The automatic connecting includes, at least: identifying a correspondence between the first game system definition and a second game system definition, the second game system definition being associated with the second game system, the second game system definition corresponding to a second game object; and preventing a change to the first game object during runtime of the computer-implemented game based on a detection that the change to the first game object would violate a rule associated with the second game system definition.

The present invention includes apparatuses which perform one or more operations or one or more combinations of operations described herein, including data processing systems which perform these methods and computer readable media which when executed on data processing systems cause the systems to perform these methods, the operations or combinations of operations including non-routine and unconventional operations.

Game development is typically very specific to a game genre so that the development process is tied directly to a specific genre (e.g., a match-3 framework, an idle-game framework, or a First-Person-Shooter game framework). Furthermore, game development may involve balancing both extensibility (e.g., a solution that can adapt to many different use cases) and simplicity (e.g., a simple solution that is not over-designed or over-engineered). The systems and methods described herein, unlike conventional systems, are able to provide a set of game systems designed to be simple and extensible enough to fit into different game genres, styles, and implementations.

In accordance with an embodiment, there is provided herein gaming system development systems and methods that provide pre-built game systems that are flexible and fully extensible for use in game development (e.g., can be used in a plurality of games developed for different genres or styles). The gaming system development systems and methods provided herein provide many benefits to game developers; one such benefit is that it makes game development easy and quick (e.g., via the operations shown in the method 200 described with respect to FIG. 2) so that a game developer can spend more time focusing on building unique gameplay (e.g., which is often more important to game players) rather than implementing features common to a particular genre or style. In accordance with an embodiment, the gaming system development systems and methods described herein may be implemented within an application interface (API), as tools within an application user interface (UI), and as a combination of both.

Turning now to the drawings, systems and methods, including non-routine or unconventional components or operations, or combinations of such components or operations, for a gaming system development system in accordance with embodiments of the invention are illustrated. In accordance with an embodiment and shown in FIG. 1 is a schematic showing details of a Game System device 102 within a gaming system development system 100. The Game System device 102 includes one or more central processing units 103 (CPUs), and graphics processing units 105 (GPUs). The CPU 103 (and the GPU 105) is any type of processor, processor assembly comprising multiple processing elements (not shown), having access to a memory 101 to retrieve instructions stored thereon, and execute such instructions. Upon execution of such instructions, the instructions implement the processing device 103 to perform a series of tasks as described herein in reference to FIG. 2 and FIG. 3. The memory 101 can be any type of memory device, such as random access memory, read only or rewritable memory, internal processor caches, and the like.

The Game System device 102 also includes one or more input/output devices 108 such as, for example, a keyboard or keypad, mouse, pointing device, touchscreen, microphone, camera, and the like, for inputting information in the form of a data signal readable by the processing device 103. The Game System device 102 further includes one or more display devices 109, such as a computer monitor, a touchscreen, and a head mounted display (HMD), which may be configured to display digital content including video, a video game environment, an integrated development environment and a virtual simulation environment to a user. The display device 109 is driven or controlled by the one or more GPUs 105 and optionally the CPU 103. The GPU 105 processes aspects of graphical output that assists in speeding up rendering of output through the display device 109. The Game System device 102 may also include one or more networking devices 107 (e.g., wired or wireless network adapters) for communicating across a network.

The memory 101 on the Game System device 102 also stores a game engine 104 (e.g., executed by the CPU 103 or GPU 105) that communicates with the display device 109 and also with other hardware such as the input/output device (s) 108 to present a 3D game environment (e.g., a video game) or a 3D game development environment (e.g., an integrated development environment or IDE) to the user. The game engine 104 may already include one or more modules that provide one or more of the following functionalities: animation physics for game objects, collision detection for game objects, rendering, networking, sound, animation, and the like in order to provide the user with a video game (or simulation) environment and video game development environment.

Figure 2:
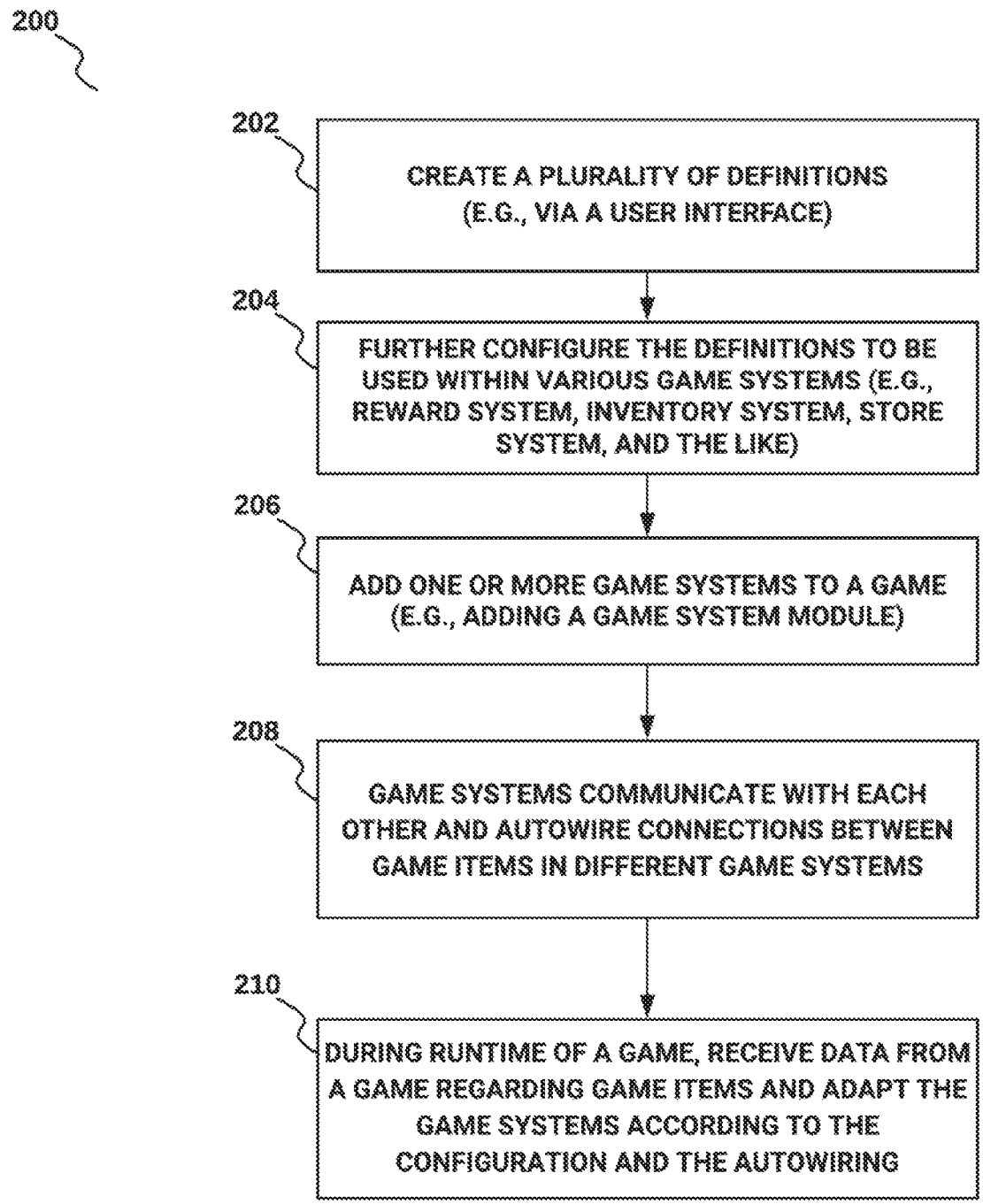
FIG. 2 is a schematic illustrating a method for gaming system development using a gaming system development system, in accordance with one embodiment.
Figure 3:
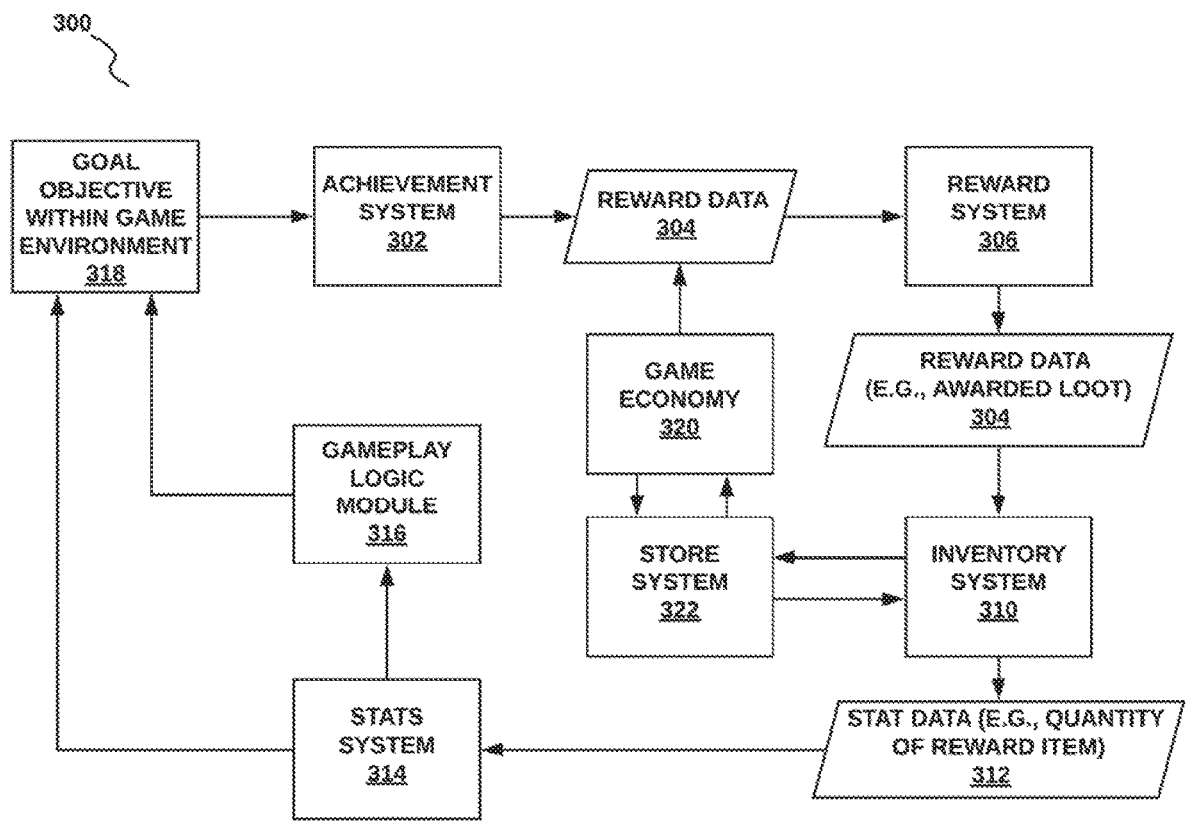
FIG. 3 is a schematic illustrating a data flow diagram for game development using a gaming system development system, in accordance with one embodiment.

In accordance with an embodiment, the memory 101 on the Game System device 102 also stores a Game System module 106 for implementing methods as described herein and in particular with respect to the methods shown in FIG. 2 and FIG. 3. The Game System module 106 may be implemented for example as a software development kit (SDK).

Game System Definition

In accordance with an embodiment, the term game system definition is used herein to refer to data that describes an aspect of a game for a Game System (e.g., an object, a goal, a reward, and the like). In accordance with an embodiment, a game system definition may be associated with a game object in a game scene. A game system definition can be used to predefine (e.g., prior to a runtime of a game) one or more properties of a Game Item (a Game Item is described below). A game system definition is a single description of properties (e.g., for a game object) which can be used during a runtime execution of a game to spawn (e.g., instantiate) a plurality of game objects from the same game system definition (e.g., as part of operation 210 of the method 200 shown in FIG. 2). A game system definition (e.g., as used within the methods described with respect to FIG. 2 and FIG. 3) is a single point of reference that can be used for a description of a game object rather than copying data from within the game system definition to each instantiated game object. For example, a game may want to spawn multiple instances of a type of game object wherein each instance shares the same properties (e.g., 'apple1', 'apple2', and 'apple3' may all be instances which refer to a single 'apple' game system definition).

Game Item

In accordance with an embodiment, a Game Item may be a data structure that may be used to track and modify objects while playing a game. The objects could be visible objects in the game, such as characters, weapons, currencies, and containers, or more abstract concepts such as quests, achievements, stats, and more. In accordance with an embodiment, a Game Item only exists at runtime (e.g., while a game is being played on a device) and only contains data (e.g., data from a database). For example, a Game Item may not contain logic and may not be capable of modifying itself; rather, a game system as described herein (e.g., with respect to FIG. 1, FIG. 2 and FIG. 3) may modify a Game Item (e.g., by modifying the data therein). In accordance with an embodiment, data within a Game Item (e.g., within a Detail as defined below) may be temporary data that only exists at runtime, or it may include data which will persist across a plurality of runtimes (e.g., across a plurality of game playing sessions). In accordance with an embodiment, a Game Item stores data in Details (described below). In accordance with an embodiment, a Game Item includes a display name, an ID, and a link to data that describes the Game Item (e.g., a Detail as described below).

Detail

In accordance with an embodiment, an item Detail is data which can be associated with a Game Item and which helps to describe a Game Item and how the Game Item may be interacted with by various Game Systems (described below) within the game system module 106 during operation. For example, a sprite (e.g., a 2D bitmap) icon Detail can include data that provides a Game System of the various Game Systems with information on a specific asset which must be used by the Game System when displaying, modifying, or otherwise using or interacting with the sprite. As another example, a currency Game Item may include a currency Detail, wherein the currency Detail may include data that describes a type of currency to use by a Game System in association with the currency Game Item (e.g., when displaying the currency Game Item, when counting the currency Game Item, and the like).

In accordance with an embodiment, a Detail may be added to a Game Item during runtime (e.g., during operation 210 of the method 200 while a game is being played). In accordance with an embodiment, a Detail may also include one or more definitions and so a Detail game system definition may be added to a Game Item game system definition. In accordance with an embodiment, a Detail game system definition will automatically instantiate a corresponding runtime Detail if necessary (e.g., if required to do so by game logic as part of operation 210). The difference between a Detail game system definition and a runtime Detail is that the Detail game system definition is a point of reference that does not change during game play, while the runtime Detail stores the state of some data which can fluctuate at runtime and needs to be included in an external data file when saving game data between playing sessions.

Game Systems

In accordance with an embodiment, a Game System within the gaming system development system 100 is a hub for managing data at runtime within a game (e.g., while a game is executing on a device). A Game System maintains one or more collections of Game Items and based on instructions therein determines a management (e.g., how a Game Item is modified during a runtime) of the one or more collection of Game Items and determines a communication with other Game Systems. For example, a Game System may manage a Game Item by applying rules (e.g., rules associated with the Game Item during operation 204 of the method 200 described with respect to FIG. 2) to the Game Item (e.g., applying rules to read and modify data within the Game Item).

In accordance with an embodiment a first Game System may block a second Game System from changing data associated with a Game Item within the first Game System (e.g., because the first Game System may have specific rules and criteria regarding a modification of the Game Item). As an example, a first Game System may receive a request (e.g., with a programming query) from a second Game System to change data associated with a Game Item within the first Game System. As an example of a Game System applying rules, consider a backpack game object within a game, wherein the backpack has been created as an Inventory System (Inventory System is described below). The backpack Inventory System may have a rule (e.g., created by a game creator and assigned to the backpack in operation 202 and 204 of the method 200 described in FIG. 2) regarding a maximum capacity for Game Items within the backpack (e.g., a max capacity for green gem Game Items). If a second Game System were to increase the quantity of Game Items in the backpack directly, the second Game System could easily exceed the maximum capacity of the backpack causing an error during a runtime (e.g., during a playing of the game). Alternatively, the second Game System could send (e.g., during operation 210 of the method 200 described below with respect to FIG. 2) a query to the backpack Game System instructing the backpack to manage the increase of the quantity of Game Items within the backpack (e.g., to avoid breaking rules). Continuing with the example, the backpack Game System may determine that the requested increase within the query would exceed the maximum capacity of the backpack, and based on the determination, the backpack Game System may prevent the requested increase from being applied.

In accordance with an embodiment, Game Item data is shared between a plurality of Game Systems. For example, when a coin object is created in a game (e.g., due to a player achieving an objective during a game), both a Wallet System and a Store System may each require a version of the coin (the Wallet System and Store System are both types of Game Systems and are described below). Continuing with the example, instead of defining a separate coin Game Item for each system, a single coin Game Item can be created in an Inventory Game System, wherein the Wallet System and the Store System refer to the coin Game Item in the Inventory Game System (e.g., using a Game Item ID).

Game production is a creative activity and game content can be different from one game to another. However, the gaming system development system described herein normalizes common patterns in game development into a plurality of gameplay systems (e.g., Game Systems) that may be common to a plurality of games, including: Game Economy Game System, Inventory Game System, Wallet Game System, Stats Game System, Progression Game System, Store Game System, Reward Game System, Achievement Game System, and Login Game System. The Game Systems interact with each other. In accordance with an embodiment, a Game System may be visually implemented within a user interface (UI) along with tools to modify values within the Game system (e.g., as part of operation 202 and operation 204 of the method 200 described with respect to FIG. 2). The displayed UI may also be used to input descriptions of interactions between Game Systems (e.g., create links and provide rules for data transfer between Game Systems).

Inventory Game System

In accordance with an embodiment, an Inventory Game System (also referred to herein as Inventory System) monitors a set of Game Items. The monitoring may include keeping track of a type and a number of Game Items in the set during a playing of a game (e.g., during a game runtime). In accordance with an embodiment, a Game Item that is in contact with, can carry or contain other Game Items may be associated with an Inventory System. In accordance with an embodiment, an Inventory System may communicate with other Game Systems during a playing of a game in order to track the type and the number of a Game Item within the Inventory System over time (e.g., throughout the playing of the game). In accordance with an embodiment, an Inventory System includes a runtime instance and a game system definition (e.g., the definition describes the Inventory System outside of game runtime). Some basic examples of an Inventory System include a backpack Game Item (e.g., a game object backpack) or a chest Game Item (e.g., a game object chest) since both can contain other Game Items; however, other sets of Game Items may be considered as Inventory Systems as well. In accordance with an embodiment, a contact between two or more Game Items (e.g., game objects) may provide a means for creating an Inventory System, for example; during playing of a game, when loot is sitting on the ground, the loot may be included in a 'ground' Inventory System. Similarly, if a sword game object has boosting gems installed in it (e.g., attached to a hilt of the sword), then the sword may include an Inventory System that includes the gems.

Wallet Game System

In accordance with an embodiment, a Wallet Game System (e.g., also referred to herein as a Wallet System) is a special variation of an Inventory System which only contains currencies (e.g., Game Items related to currency). An example for using a wallet is in mobile games wherein a player can accumulate one or more types of currency within a Wallet Game System, such as coins, gems, etc.

Stats Game System.

In accordance with an embodiment, there is provided a Statistics Game System (or 'Stats System') wherein numeric values associated with one or more Game Items are tracked and managed. In accordance with an embodiment, a Stats System communicates with (e.g., queries and receives data from) Game Items and other Game Systems in order to determine the numeric values. In accordance with an embodiment, any type of numeric value may be used, including integers, floating point numbers, and the like. In accordance with an embodiment, formulae may be applied to values within a Stats System (e.g., to determine trends, generate statistics, modify values over time, and more). In accordance with an embodiment, the formulae may be triggered by player progression in a playing of a game. A Statistics System allows for the tracking and management or numeric values associated with Game Items within a game, including values such as character health (e.g., a health value of a player Game Item or enemy Game Item), speed value of a Game Item, damage value for a weapon Game Item, durability value for a tool Game Item, healing value for a consumable Game Item (e.g., energy providing food source within a game), and the like.

In accordance with an embodiment, a Stats System may be a fundamental layer that receives data from and communicates data to other Game Systems active within a playing of a game. Accordingly, all Game Systems may share data with the Stats System and the Stats System may share data with all the Game Systems for a game. In accordance with an embodiment, a Stats System provides a central description of state of Game items for all Game Systems within a game. In accordance with an embodiment, the Stats System may track a plurality of attributes of Game Items. In accordance with an embodiment, a Game System may input and output gameplay states in the form of numeric values to the Stats System (e.g., a state of a Game System may be described with a plurality of values associated with Game Items within the Game System), so that the numeric values can be used to chain Game Systems together, thus allowing different Game Systems to communicate with each other. The communication via a Stats System may occur without prior knowledge within a Game System of specific gameplay concepts, including the concept of health, speed, durability, and the like.

In accordance with an embodiment, a Stats System may manage an access of other Game Systems to data within the stats system. For example, other Game Systems may be blocked from accessing the Stats System and/or other Game Systems may have shared access to the Stats System data.

Game Economy Game System

In accordance with an embodiment, there is provided a Game Economy Game System (e.g., referred to herein as the Game Economy System), whereby the Game Economy is a source of all game system definitions for all Game Items. The game system definitions within a Game Economy System may be used by all other Game Systems. In accordance with an embodiment, two or more Game Economy Systems can be connected together to form a chain and whereby the interaction between the connected systems is governed by resource chain management operations. Accordingly, each Game Economy System includes an input resource, an output resource and a description of processing for a resource (e.g., a way in which a Game Economy System transforms or consumes the resource). The description of processing may be predetermined by a game creator (e.g., determined during a development of a game). In accordance with an embodiment, the input resource may be a Game Item, and the output resource may be a Game Item. In accordance with an embodiment, the output resource may be a modified version of an input resource (e.g., a modified Game Item), or the output resource may be a new Game Item created by the Game Economy System. In accordance with an embodiment, a Game Economy System may be associated with a Game item (e.g., a farmer field game object may be associated with a Game Economy System that manages input resources and output resources of the field, as described in an example below).

In accordance with an embodiment, a game creator can provide data describing relationships between game resources with respect to a Game Economy System (e.g., a relationship between a set of input resources and a set of output resources). The data describing the relationships may be used by the Game Economy System to determine an economic value (e.g., economic cost) associated with a resource (e.g., a Game Item), which can then be used to determine a price recommendation for the resource. As an example, in a farming game there may be provided a Game Economy System associated with a field Game Item and a chicken Game Item along with the following additional Game Items: water, a crop, and an egg. The field Game Economy System may be described such that it takes 3 water Game Items as input and produces one crop Game Item as output. Furthermore, the chicken Game Economy System may be described such that it takes one crop Game Item and one water Game Item as input and generates one egg Game Item as an output. In accordance with an embodiment, a Game Economy System may make game tuning predictions related to the lifetime of a resource (e.g., how long a resource may exist in a game) based on a determination of economic cost.

Progression Game System

In accordance with an embodiment, there is provided a Progression Game System (e.g., referred to as 'Progression System') which tracks and manages progression of a character through a playing of a game (e.g., during a game runtime). In accordance with an embodiment, a Progression System may include predetermined descriptions for progression dimensions, tiers and associated Stats overrides. In accordance with an embodiment, the predetermined descriptions are created (e.g., by a game developer) during operation 204 of the method 200. The Progression System can include point based progression and player level based progression.

As an example, a plurality of player energy levels can be used as a predetermined progression dimension. As another example, a plurality of player skill levels can be used as a predetermined progression dimension. For example, each skill level of the plurality of skill levels can be a progression tier, wherein each tier includes a threshold requirement to reach a next tier, and on each tier, the Progression System may override player attributes (e.g., to a different value) based on a predetermined description for the tier. In accordance with an embodiment, upgradable and unlockable game mechanics can also be implemented with a Progression System (e.g., with a different game mechanic associated with each tier).

Achievement Game System

In accordance with an embodiment, there is provided an Achievement Game System (e.g., referred to as an 'Achievement System') that includes a plurality of predetermined goals and associated reward outcomes (e.g., the goals and associated reward outcomes may be determined during operation 202 of the method 200 described in FIG. 2). The Achievement System can include data which describes goals for players (e.g., characters) to achieve within a playing of a game (e.g., during a runtime of a game). In accordance with an embodiment, the Achievement System may also track goals and a reward outcome associated with an achievement of a goal for each player of a game and for each goal. In accordance with an embodiment, an Achievement System may be linked to a Progression System whereby some achievements tracked by the Achievement System are linked (e.g., during operation 204 of the method 200 described with respect to FIG. 2) to a progression of a player within a playing of a game wherein the progression is tracked by the Progression System.

Store Game System

In accordance with an embodiment, a Store Game System (e.g., referred to herein as a 'Store System') communicates with a Game Economy System to request data (e.g., definition, price, etc.) regarding purchasable resources (e.g., resources defined as purchasable during operation 202 of the method 200 described in FIG. 2). In accordance with an embodiment, the requested and received data may be stored within a catalog within the Store System. In accordance with an embodiment, the Store System may use the data within the catalog to present users with a storefront (e.g., an in-app purchasing store within a game). A graphical layout of a storefront may be chosen from a predefined template (e.g., associated with the Store System during operation 204 of the method 200 described in FIG. 2).

In accordance with an embodiment, the Store System may communicate with an inventory System and a Reward system to manage a granting of Game Items or a consuming of Game Items by players during a playing of a game. The communication may occur during operation 208 of the method 200 described in FIG. 2, whereas a description of the communication may be defined during operation 204 of the method 200 described in FIG. 2. For example, due to a purchasing of a Game Item in a Store System by a player, the Store System may communicate with the inventory system to track the purchase. As another example, based on a reception of a gameplay reward by a player, a Reward Game System may communicate the reception of the reward to an Inventory System in order to track the reception of the award.

Purchase Game System

In accordance with an embodiment, there is provided a Purchase Game System (e.g., referred to herein as a 'Purchase System') which manages purchasing (e.g., with or without a Store System). In accordance with an embodiment, a Game Item can be labeled as 'purchasable' (e.g., during operation 204 of the method 200 described in FIG. 2) such that the Purchase System tracks and manages the purchase of the Game Item. In accordance with an embodiment, the Purchase System communicates with a Store System. For example, a Game Item within the Store System that is labeled as 'purchasable' will be communicated to (e.g., during operation 208 of the method 200 described in FIG. 2) and appear in the Purchase System. In accordance with an embodiment, the Purchase System may be independent from the Store System since a purchase may be initiated directly by a player without involving the Store System (e.g., without going through a displayed store user interface within a game).

In accordance with an embodiment, FIG. 2 shows a method 200 for gaming system development using a gaming system development system 100. At operation 202 of the method 200, a plurality of game system definitions for Game Items are defined (e.g., by a game developer/creator). In accordance with an embodiment, the game system definitions may be generated and modified within a user interface (UI), having interactive user interface elements, and which may be part of the game engine 104 (e.g., a game engine development tool for game creation such as the Unity Editor by Unity Technologies Inc.). In accordance with an embodiment, as part of operation 202, a game system definition may be created and modified within a user interface connected to a game engine 104.

In accordance with an embodiment, at operation 204 of the method 200, the game system definitions are further configured to be used within various Game Systems (e.g., a Reward System, an Inventory System, a Store System, and the like).

In accordance with an embodiment, at operation 206 of the method 200, one or more Game Systems are added to a game (e.g., by the game creator). In accordance with an embodiment, operation 206 achieved within a user interface (UI) by adding and manipulating icons that represent game systems (e.g., via drag and drop mechanism). In accordance with another embodiment, adding a Game System during operation 206 may be achieved by modifying code to add a reference to a predefined code module associated with a Game System within source code for a game.

In accordance with an embodiment, at operation 208 of the method 200, the added Game Systems communicate with each other and auto-wire (e.g., automatically connect) Game Items between the different added systems (auto-wiring described below).

In accordance with an embodiment, at operation 210 of the method 200, during runtime of the developed game (e.g., during a playing of the game), the game system module 106 receives data from the game (e.g., from the game engine 104) regarding Game Items (and the Details therein) which may change based on game play (e.g., based on actions of a player and a response from the game), and adapts the Game Systems (e.g., updating Game Item Details therein) according to the configuration (e.g., from operation 204), the auto-wiring (e.g., automatic connection) (e.g., from operation 208) and the received data. In accordance with an embodiment, game system definitions may not be modified during runtime (e.g., during operation 210). However, data within a Detail of a Game Item created from a game system definition during runtime may be modified as part of operation 210. The Detail data for a Game Item may be saved (e.g., to a file) in order to keep the data in use from one session to another (e.g., from one game play to another).

Auto-Wiring (Automatic Connection) of Common Gameplay Behaviors

The gaming system development system described herein not only provides common gameplay systems, but can auto-wire (e.g., automatically connect) the systems together (e.g., according to rules) to share data (e.g., Game Items) in order to accomplish many typical gameplay behaviors. In accordance an embodiment, the rules for the auto-wiring are predetermined for each Game System (e.g., as described below). In accordance with an embodiment, the rules for auto-wiring are received via a user interface (e.g., from a game developer). In accordance with an embodiment, FIG. 3 shows an example of auto-wiring (e.g., automatic connection) of a plurality of Game Systems as described with respect to operation 208 in FIG. 2. In accordance with an embodiment and shown in FIG. 3, the automatic connection includes a rule connecting an Inventory System 310 with a Store System 322, wherein an Inventory System 310 is configured to add a Game Item purchased in a Store System 322 to the Inventory System 310. Similarly, the automatic connection may include a rule wherein a Game Item added to the Inventory System 310 is automatically added to the Store System 322 for display in the store (e.g., if the game items have a specific tag). In accordance with an embodiment and shown in FIG. 3, the automatic connection includes a rule connecting an Achievement System 302 to a Reward System 306, wherein the Achievement System 302 is configured to register a goal achieved by a user (e.g., when a user completes an objective within a game environment 318). In accordance with an embodiment and shown in FIG. 3, the rule includes the Achievement System 302 sending reward data 304 for any achieved goal to the Reward System 306 in order to create an associated reward. In accordance with an embodiment and shown in FIG. 3, the automatic connection includes a rule for connecting the Reward System 306 and the Inventory System 310, wherein the Reward System 306 is configured to automatically send reward data 304 (e.g., associated loot) to the Inventory System 310 to be added in the Inventory System. In accordance with an embodiment and shown in FIG. 3, the automatic connection includes a rule connecting the Inventory System 310 with a Stats System 314, wherein the Inventory System 310 is configured to automatically send statistical data 312 (e.g., quantity of rewarded items) to a Stats System 314. In accordance with an embodiment, the goal to achieve 318 can be associated with a statistic in order to be tracked and modified by the Stats System 314. For example, a goal might be to "beat a level X times" wherein 'X' is a numerical value managed by the Stats System 314. In accordance with an embodiment, rules for auto-wiring (e.g., automatic connection) may be changed or modified dynamically and cause the systems to re-wire accordingly.

Figure 4:
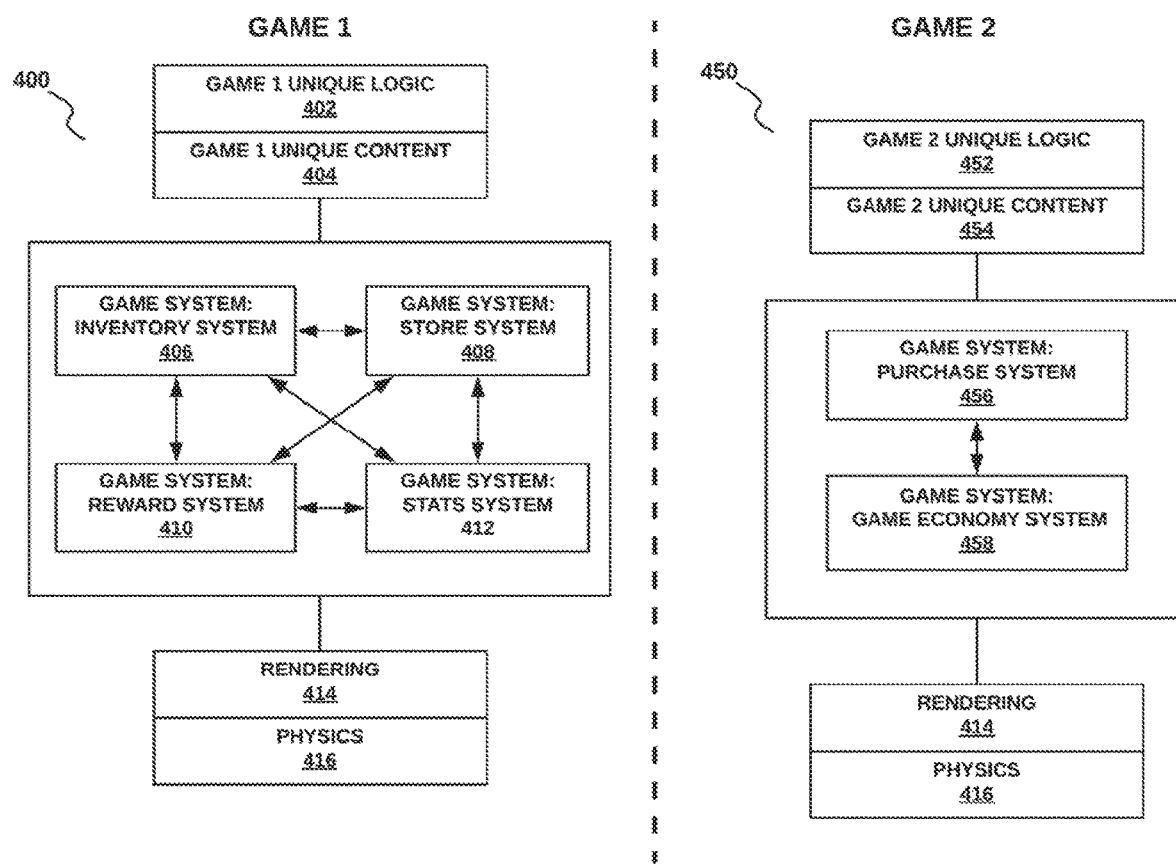
FIG. 4 is a schematic illustrating a development of two different games using the gaming system development system, in accordance with one embodiment.

In accordance with an embodiment, FIG. 4 is an illustration of a development of two different games using the gaming system development system 100. In accordance with an embodiment, FIG. 4 may be an illustration of operation 206 of the method 200 described in FIG. 2 whereby Game Systems are added to a game during a game development. The illustration in FIG. 4 shows that the gaming system development system 100 can be used to add a set of Game Systems to a game, wherein the set of Game Systems can be different for each game. The added set of Game System sits between a rendering engine 414 and a physics engine 416 (e.g., which may be part of the game engine 104) and game specific logic (e.g., 402 and 452) and game specific content (e.g., 452 and 454). The game specific logic (e.g., 402 and 452) including logic controlling game play and game specific content (e.g., 452 and 454) including digital content for a game (e.g., 3D models, animations, sounds, and more).

In accordance with an embodiment, on the left side of the illustration in FIG. 4 is a game (e.g., 'Game 1') that includes the following 4 Game Systems: an Inventory System 406, a Store System 408, a Reward System 410, and a Stats System 412. On the right side of the illustration in FIG. 4 is a game (e.g., 'Game 2') that includes the following 2 Game Systems: a Purchase System 456 and a Game Economy System 458.

While illustrated in the block diagrams as groups of discrete components communicating with each other via distinct data signal connections, it will be understood by those skilled in the art that the various embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present various embodiments.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. Such software may at least temporarily transform the general-purpose processor into a special-purpose processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers, to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 5:
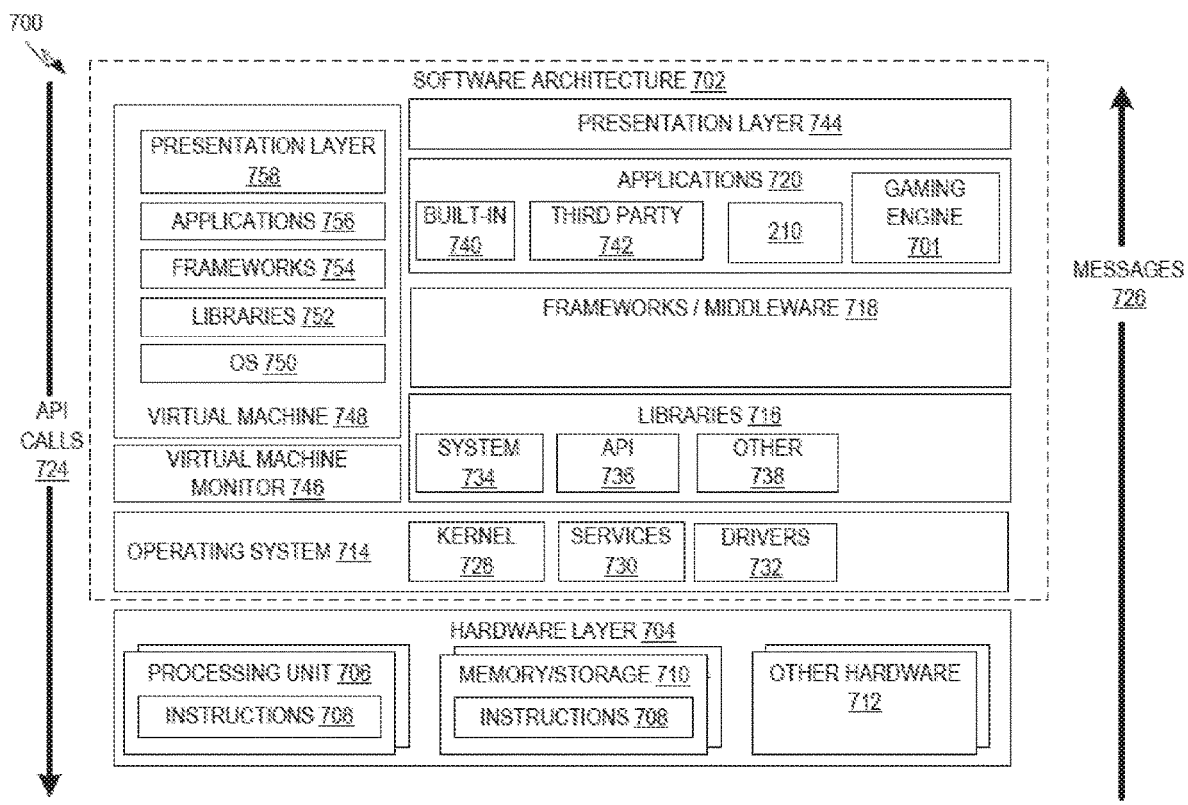
FIG. 5 is a block diagram illustrating an example software architecture, which may be used in conjunction with various hardware architectures described herein.

FIG. 5 is a block diagram 700 illustrating an example software architecture 702, which may be used in conjunction with various hardware architectures herein described to provide a gaming engine 701 and/or components of the gaming system development system. FIG. 5 is a non-limiting example of a software architecture and it will be appreciated that many other architectures may be implemented to facilitate the functionality described herein. The software architecture 702 may execute on hardware such as a machine 800 of FIG. 6 that includes, among other things, processors 810, memory 830, and input/output (I/O) components 850. A representative hardware layer 704 is illustrated and can represent, for example, the machine 800 of FIG. 6. The representative hardware layer 704 includes a processing unit 706 having associated executable instructions 708. The executable instructions 708 represent the executable instructions of the software architecture 702, including implementation of the methods, modules and so forth described herein. The hardware layer 704 also includes memory/storage 710, which also includes the executable instructions 708. The hardware layer 704 may also comprise other hardware 712.

In the example architecture of FIG. 5, the software architecture 702 may be conceptualized as a stack of layers where each layer provides particular functionality. For example, the software architecture 702 may include layers such as an operating system 714, libraries 716, frameworks or middleware 718, applications 720 and a presentation layer 744. Operationally, the applications 720 and/or other components within the layers may invoke application programming interface (API) calls 724 through the software stack and receive a response as messages 726. The layers illustrated are representative in nature and not all software architectures have all layers. For example, some mobile or special purpose operating systems may not provide the frameworks/middleware 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 may provide a common infrastructure that may be used by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 816 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) provide a higher-level common infrastructure that may be used by the applications 720 and/or other software components/modules. For example, the frameworks/middleware 718 may provide various graphic user interface (GUI) functions, high-level resource management, high-level location services, and so forth. The frameworks/middleware 718 may provide a broad spectrum of other APIs that may be utilized by the applications 720 and/or other software components/modules, some of which may be specific to a particular operating system or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. Third-party applications 742 may include any an application developed using the Android™ or iOS™ software development kit (SDK) by an entity other than the vendor or the particular platform, and may be mobile software running on a mobile operating system such as iOS™, Android™, Windows® Phone, or other mobile operating systems. The third-party applications 742 may invoke the API calls 724 provided by the mobile operating system such as operating system 714 to facilitate functionality described herein.

The applications 720 may use built-in operating system functions (e.g., kernel 728, services 730 and/or drivers 732), libraries 716, or frameworks/middleware 718 to create user interfaces to interact with users of the system. Alternatively, or additionally, in some systems, interactions with a user may occur through a presentation layer, such as the presentation layer 744. In these systems, the application/module "logic" can be separated from the aspects of the application/module that interact with a user.

Some software architectures use virtual machines. In the example of FIG. 5, this is illustrated by a virtual machine 748. The virtual machine 748 creates a software environment where applications/modules can execute as if they were executing on a hardware machine (such as the machine 800 of FIG. 6, for example). The virtual machine 748 is hosted by a host operating system (e.g., operating system 714) and typically, although not always, has a virtual machine monitor 746, which manages the operation of the virtual machine 748 as well as the interface with the host operating system (i.e., operating system 714). A software architecture executes within the virtual machine 748 such as an operating system (OS) 750, libraries 752, frameworks 754, applications 756, and/or a presentation layer 758. These layers of software architecture executing within the virtual machine 748 can be the same as corresponding layers previously described or may be different.

Figure 6:
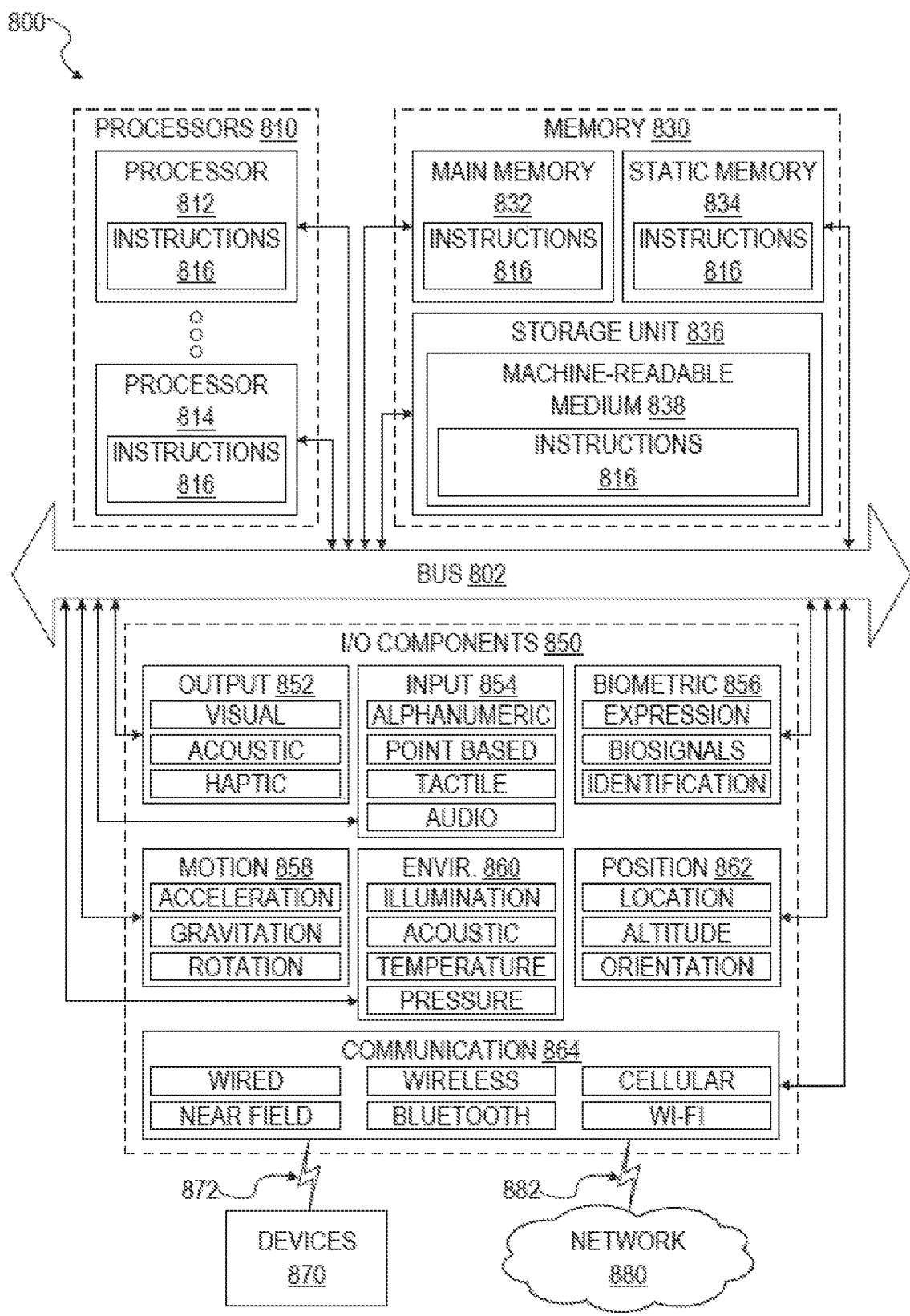
FIG. 6 is a block diagram illustrating components of a machine, according to some example embodiments, configured to read instructions from a machine-readable medium (e.g., a machine-readable storage medium) and perform any one or more of the methodologies discussed herein.

FIG. 6 is a block diagram illustrating components of a machine 800, according to some example embodiments, configured to read instructions from a machine-readable medium (e.g., a machine-readable storage medium) and perform any one or more of the methodologies discussed herein. In some embodiments, the machine 110 is similar to the HMD 102. Specifically, FIG. 6 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. As such, the instructions 816 may be used to implement modules or components described herein. The instructions transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), entertainment media system, a cellular telephone, a smart phone, a mobile device, a wearable device (e.g., a smart watch), a smart home device (e.g., a smart appliance), other smart devices, web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines that individually or jointly execute the instructions 816 to perform any one or more of the methodologies discussed herein.

The machine 800 may include processors 810, memory 830, and input/output (I/O) components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing, (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 812 and a processor 814 that may execute the instructions 816. The term "processor" is intended to include multi-core processor that may comprise two or more independent processors (sometimes referred to as "cores") that may execute instructions contemporaneously. Although FIG. 6 shows multiple processors, the machine 800 may include a single processor with a single core, a single processor with multiple cores (e.g., a multi-core processor), multiple processors with a single core, multiple processors with multiples cores, or any combination thereof.

The memory/storage 830 may include a memory, such as a main memory 832, a static memory 834, or other memory, and a storage unit 836, both accessible to the processors 810 such as via the bus 802. The storage unit 836 and memory 832, 834 store the instructions 816 embodying any one or more of the methodologies or functions described herein. The instructions 816 may also reside, completely or partially, within the memory 832, 834, within the storage unit 836, within at least one of the processors 810 (e.g., within the processor's cache memory), or any suitable combination thereof, during execution thereof by the machine 800. Accordingly, the memory 832, 834, the storage unit 836, and the memory of processors 810 are examples of machine-readable media 838.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine 800 (e.g., processors 810), cause the machine 800 to perform any one or more of the methodologies or operations, including non-routine or unconventional methodologies or operations, or non-routine or unconventional combinations of methodologies or operations, described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 850 may include a wide variety of components to receive input, provide output, produce output, transmit information, exchange information, capture measurements, and so on. The specific input/output (I/O) components 850 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 850 may include many other components that are not shown in FIG. 6. The input/output (I/O) components 850 are grouped according to functionality merely for simplifying the following discussion and the grouping is in no way limiting. In various example embodiments, the input/output (I/O) components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 850 may include communication components 864 operable to couple the machine 800 to a network 880 or devices 870 via a coupling 882 and a coupling 872 respectively. For example, the communication components 864 may include a network interface component or other suitable device to interface with the network 880. In further examples, the communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 862, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource maybe implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

We claim:

1. A system comprising:
    one or more computer processors;
    one or more computer memories;
    a set of instructions incorporated into the one or more computer memories, the set of instructions configuring the one or more computer processors to perform operations for automatically connecting a plurality of game systems, the operations comprising:
    adding a first game system of the plurality of game systems to a computer-implemented game during development of the game, a first game system including a first set of game system definitions, a first game system definition of the first set corresponding to a game item; and
    automatically connecting the first game system with a second game system of the plurality of game systems, the automatic connecting including, at least, identifying a correspondence between the first game system definition and a second game system definition, the second game system definition included in a second set of game system definitions, the second set of game system definitions included in the second game system, the second game system definition corresponding to the game item, and preventing a change to the game item during runtime of the computer-implemented game based on a detection that the change to the game item would violate one or more of a rule associated with the second game system definition and a rule associated with the first game system definition.

2. The system of claim 1, wherein the first game system is a first pluggable game system of a plurality of pluggable game systems and the second game system is a second pluggable game system of the plurality of pluggable game systems, each of the plurality of pluggable game systems configured to be pluggable into one or more computer-implemented games.

3. The system of claim 2, wherein the automatic connecting occurs when the second game system is plugged into the computer-implemented game.

4. The system of claim 1, wherein the operations further include receiving a plurality of rules associated with a plurality of game items from a user interface.

5. The system of claim 1, wherein the identifying of the correspondence between the first game system definition and the second game system definitions is determined by one or more additional rules.

6. A non-transitory computer-readable storage medium comprising a set of instructions that, when executed by one or more computer processors, cause the one or more computer processors to perform operations for automatically connecting a plurality of game systems, the operations comprising:
    adding a first game system of the plurality of game systems to a computer-implemented game during development of the game, a first game system including a first set of game system definitions, a first game system definition of the first set corresponding to a game item; and
    automatically connecting the first game system with a second game system of the plurality of game systems, the automatic connecting including, at least, identifying a correspondence between the first game system definition and a second game system definition, the second game system definition included in a second set of game system definitions, the second set of game system definitions included in the second game system, the second game system definition corresponding to the game item, and preventing a change to the game item during runtime of the computer-implemented game based on a detection that the change to the game item would violate one or more of a rule associated with the second game system definition and a rule associated with the first game system definition.

7. The non-transitory computer-readable storage medium of claim 6, wherein the first game system is a first pluggable game system of a plurality of pluggable game systems and the second game system is a second pluggable game system of the plurality of pluggable game systems, each of the plurality of pluggable game systems configured to be pluggable into one or more computer-implemented games.

8. The non-transitory computer-readable storage medium of claim 6, wherein the automatic connecting further includes preventing a change to the second game item based on a detection that a change to the second game item would violate a rule associated with the first game system definition.

9. The non-transitory computer-readable storage medium of claim 6, wherein the operations further include receiving a plurality of rules associated with a plurality of game items from a user interface.

10. A method comprising:
performing, using one or more computer processors, operations for automatically connecting game items for sharing by a plurality of game systems, the operations comprising:
adding a first game system of the plurality of game systems to a computer-implemented game during development of the game, a first game system including a first set of game system definitions, a first game system definition of the first set corresponding to a game item; and
automatically connecting the first game system with a second game system of the plurality of game systems, the automatic connecting including, at least, identifying a correspondence between the first game system definition and a second game system definition, the second game system definition included in a second set of game system definitions, the second set of game system definitions included in the second game system, the second game system definition corresponding to the game item, and preventing a change to the game item during runtime of the computer-implemented game based on a detection that the change to the game item would violate one or more of a rule associated with the second game system definition and a rule associated with the first game system definition.

11. The method of claim 10, wherein the first game system is a first pluggable game system of a plurality of pluggable game systems and the second game system is a second pluggable game system of the plurality of pluggable game systems, each of the plurality of pluggable game systems configured to be pluggable into one or more computer-implemented games.

12. The method of claim 11, wherein the automatic connecting further includes preventing a change to the second game item based on a detection that a change to the second game item would violate a rule associated with the first game system definition.

13. The method of claim 11, wherein the operations further include receiving a plurality of rules associated with a plurality of game items from a user interface.

\* \* \* \* \*